(12) United States Patent
Zhou et al.

(10) Patent No.: US 8,981,167 B2
(45) Date of Patent: Mar. 17, 2015

(54) FLUOROGRAPHENE AND PREPARATION METHOD THEREOF

(75) Inventors: Mingjie Zhou, Shenzhen (CN); Daxi Liu, Shenzhen (CN); Yaobing Wang, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 109 days.

(21) Appl. No.: 13/988,289

(22) PCT Filed: Dec. 22, 2010

(86) PCT No.: PCT/CN2010/080123
§ 371 (c)(1),
(2), (4) Date: May 17, 2013

(87) PCT Pub. No.: WO2012/083533
PCT Pub. Date: Jun. 28, 2012

(65) Prior Publication Data
US 2013/0261352 A1    Oct. 3, 2013

(51) Int. Cl.
*C07C 43/225* (2006.01)
*C07C 22/08* (2006.01)
*C01B 31/04* (2006.01)
*C01B 31/00* (2006.01)
*B82Y 30/00* (2011.01)
*B82Y 40/00* (2011.01)

(52) U.S. Cl.
CPC ......... *C01B 31/0484* (2013.01); *C01B 31/0438* (2013.01); *C01B 31/005* (2013.01); *C01B 31/043* (2013.01); *C01B 31/0476* (2013.01); *B82Y 30/00* (2013.01); *B82Y 40/00* (2013.01)
USPC ........................................................ 570/129

(58) Field of Classification Search
CPC ............................... C07C 43/225; C07C 22/08
See application file for complete search history.

(56) References Cited

FOREIGN PATENT DOCUMENTS

WO    WO2011154748 A    12/2011

OTHER PUBLICATIONS

Nair et al. (Small, 2010, 6(24), 1-20 (including supporting on-line material)).*
Rahul R. Nair, et al. Fluorographene: A Two-Dimensional Counterpart of Teflon. Small. 2010, 6, No. 24, p. 2877-2884. Published online: Nov. 4, 2010.
Jeremy T. Robinson, et al. Properties of fluorinated graphene films. Nano Letters. 2010, vol. 10, No. 8, p. 3001-3005.
S.-H. Cheng, et al. Reversible fluorination of graphene: Evidence of a two-dimensional wide bandgap semiconductor. Physical Review. B. 2010. vol. 81, No. 20, p. 205435.
Hiroto Tachikawa, et al. A Direct Molecular Orbital?Molecular Dynamics Study on the Diffusion of the Li Ion on a Fluorinated Graphene Surface. The Journal of Physical Chemistry. C. 2008. vol. 112, No. 27, p. 10193-10199.

* cited by examiner

*Primary Examiner* — Sudhakar Katakam
*Assistant Examiner* — Jennifer C Sawyer
(74) *Attorney, Agent, or Firm* — Shimokaji IP

(57) ABSTRACT

A fluorographene and preparation method thereof are provided. For the said fluorographene, the fraction of F is 0.5<F %<53.5% in weight and the fraction of C is 46.5%<C %<99.5% in weight. The method comprises the following steps: providing the graphite; preparing the graphene oxide with the graphite; mixing the graphene oxide with the compound containing fluorine by weight ratio of 1:1~100:1 in anaerobic environment, reacting at 200~1 000° C. for 1~10 hours then cooling down to obtain the said fluorographene. The above-mentioned method using graphite to prepare the graphene oxide, then making use of the reaction of graphene oxide with the compound containing fluorine under a certain temperature has simple process and can prepare fluorographene conveniently.

11 Claims, 2 Drawing Sheets

FLUOROGRAPHENE AND PREPARATION METHOD THEREOF

FIELD OF THE INVENTION

The present invention relates to the field of organic semiconductor materials technique, more particularly, the present invention relates to fluorographene and preparation method thereof.

BACKGROUND OF THE INVENTION

Since Andre K. Geim and co-workers at Manchester University in the United Kingdom successfully produced graphene material in 2004, graphene material has attracted considerable attention owing to its unique structure and photoelectrical properties. Graphene is considered as a "rising star" in the field of materials science and condensed matter physics. It has attracted intensive attention because of its unique and potential technical applications. Single-layer graphene has large specific surface area, excellent electrical conductivity, thermal conductivity, low coefficient of thermal expansion. Such as: 1, high strength, Young's modulus (1100 GPa), breaking strength (125 GPa); 2, high thermal conductivity, thermal conductivity coefficient (5,000 W/mK); 3, high electrical conductivity, the transmission rate of carriers (200,000 $cm^2/V*s$); 4, large specific surface area, (the theoretical value: 2,630 $m^2/g$). Especially for its high electrical conductivity, large specific surface area and single-layer planar nanoscale structure, it can be used as electrode materials of super capacitor and lithium-ion battery.

Fluorographite, being used as an active material of high energy lithium-ion battery, has caught great attention of researchers in the field of new chemical power supply. Relevant high energy batteries have been successfully developed. Fluorographite-lithium battery has the following advantages: (1) high voltage, high energy density. As for normal manganese batteries, the nominal voltage is 3V, energy density is 360 wh/kg, but for cylindrical fluorographite-lithium battery, the nominal voltage is two times that of manganese batteries, energy density is 5~10 times that of manganese batteries. (2) High utilization rate, stable voltage. Based on discharge reaction, utilization rate is almost 100% due to the formation of electrically conductive carbon. The internal resistance does not increase during discharge; the discharge voltage keeps stable until the end of discharge. Long storage life and wide temperature range.

Fluorographene is a compound having high mechanical strength, chemical stability and thermal stability. The properties of such new materials are extremely similar to polytetrafluoroethylene, thus being called planar polytetrafluoroethylene.

However, how to obtain fluorographene by an easy method is a difficult problem still existing nowadays.

SUMMARY OF THE INVENTION

In view of this, it is necessary to provide at least one preparation method of fluorographene having simple process, and fluorographene produced by the above-mentioned preparation method of fluorographene.

A fluorographene, wherein the mass fraction of F is in the range of 0.5<F %<53.5%, the mass fraction of C is in the range of 46.5%<C %<99.5%.

Preferably, the mass fraction of F is in the range of 4.7%<F %<38.6%, the mass fraction of C is in the range of 61.4%<C %<95.3%.

A preparation method of fluorographene, comprising:
providing graphite;
preparing graphene oxide with said graphite;
mixing said graphene oxide with compound containing fluorine by mass ratio of 1:1~100:1 in oxygen-free environment, then reacting at 200~1 000° C. for 1~10 hours then cooling down to obtain said fluorographene.

Preferably, said compound containing fluorine is at least one of ammonium fluoride, sodium fluoroborate, potassium fluoroborate, potassium fluoroaluminate, and sodium fluorosilicate.

Preferably, said compound containing fluorine at least one of polytetrafluoroethylene, polyhexafluoropropylene, and polyvinylidene fluoride.

Preferably, the mass ratio of said graphene oxide to said compound containing fluorine is in the range of 1:1~1:50.

Preferably, said graphene oxide reacts with said compound containing fluorine at 500~800° C. to obtain said fluorographene.

Preferably, said preparation method of fluorographene further comprises purification process that: after obtaining said fluorographene, washing said fluorographene successively with water and ethanol, then drying.

Preferably, the step of preparing graphene oxide with said graphite comprises:
adding said graphite, potassium persulfate and phosphorus pentoxide by mass ratio of 2:1:1 into concentrated sulfuric acid at 75~95° C., stirring well and then cooling naturally, washing until the washing become neutral, then drying to obtain pretreated mixture;
adding said pretreated mixture and potassium permanganate into concentrated sulfuric acid below 20° C., then heating in an oil-bath at 30~40° C. for 1.5~2.5 h, adding deionized water, after 15 minutes, adding hydrogen peroxide to react, filtrating by applying pressure, collecting solid;
washing said solid with diluted hydrochloric acid, drying to obtain said graphene oxide.

Preferably, degree of purity of said graphite is higher than 99.5%.

The above-mentioned preparation method of fluorographene using graphite to prepare the graphene oxide, then making use of the reaction of graphene oxide with the compound containing fluorine under a certain temperature has simple process and can prepare fluorographene conveniently.

DETAILED DESCRIPTION OF ILLUSTRATED EMBODIMENTS

Further description of preparation method of fluorographene will be illustrated, which combined with embodiments and the drawings.

A fluorographene, wherein the mass fraction of F is in the range of 0.5<F %<53.5%, the mass fraction of C is in the range of 46.5%<C %<99.5%.

In one preferred embodiment, the mass fraction of F is in the range of 4.7%<F %<38.6%, the mass fraction of C is in the range of 61.4%<C %<95.3%.

Such fluorographene is obtained by placing oxygen atom of graphene oxide with fluorine atom.

It can be seen from the electron microscope that such fluorographene has wrinkled structure which is favorable for improving specific surface area.

The above-mentioned fluorographene contains trace amount of H, however, the amount is too small to be neglected.

Figure 1:
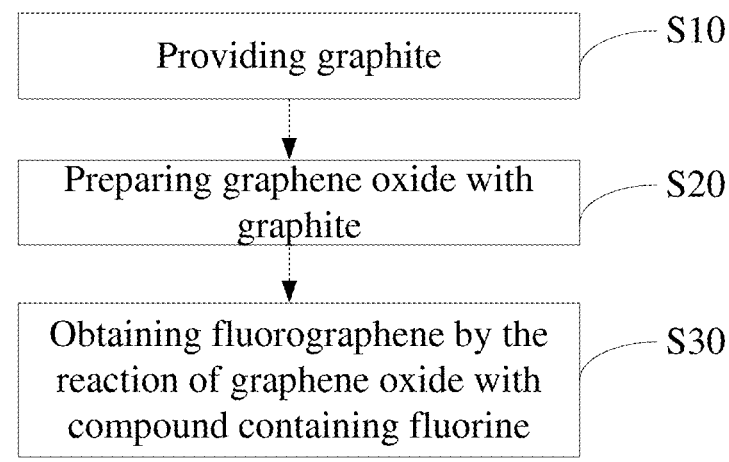
FIG. 1 is a flow chart of preparation method of fluorographene of one embodiment.

As shown in FIG. 1, a preparation method of the above-mentioned fluorographene, comprising:

S10, providing graphite;

Graphite having degree of purity higher than 99.5% is purchased.

S20, preparing graphene oxide with said graphite;

Normally, graphite oxide can be prepared by Hummers method, which comprises: placing graphite, potassium permanganate and concentrated strong oxidizing acid (sulfuric acid or nitric acid) into the same container for heating by water-bath or oil-bath, fully oxidizing then taking out, reducing potassium permanganate with hydrogen peroxide firstly, then washing the products with distilled water or hydrochloric acid for many times, drying to obtain graphite oxide.

In order to prepare graphene oxide, Hummers method can be improved, the improved preparation method comprises the following steps.

Firstly, adding graphite, potassium persulfate and phosphorus pentoxide by mass ratio of 2:1:1 into concentrated sulfuric acid at 75~95° C., stirring well and then cooling naturally, washing to neutrality, then drying to obtain pretreated mixture.

Secondly, adding said pretreated mixture and potassium permanganate into concentrated sulfuric acid, keeping the temperature below 20° C., then heating in an oil-bath at 30~40° C. for 1.5~2.5 h, adding deionized water, after 15 minutes, adding hydrogen peroxide to react, filtrating by applying pressure, collecting solid.

At last, washing said solid with diluted hydrochloric acid, drying to obtain said graphene oxide.

The purpose of heating by oil-bath is to control reaction temperature more easily. In other embodiments, water-bath can also be used.

S30, obtaining fluorographene by the reaction of graphene oxide with compound containing fluorine.

The method which involves producing fluorographene by the reaction of graphene oxide obtained from step S20 with compound containing fluorine is called solid-phase method. Referring to compound containing fluorine that can be divided into inorganic compound containing fluorine and polymers containing fluorine, solid-phase method also includes inorganic solid-phase method and organic solid-phase method, which will be described below in detail.

Preparation of Fluorographene Using Inorganic Solid-Phase Method

Thermal decomposable inorganic compound containing fluorine is used in this method to react with the graphene oxide obtained from step S20. Normally, the inorganic compound containing fluorine adopted can be listed as follows: ammonium fluoride, sodium fluoroborate, potassium fluoroborate, potassium fluoroaluminate, and sodium fluorosilicate. In practice, any one of them or their combinations can be used.

Firstly, drying inorganic compound containing fluorine, where the drying temperature is lower than its decomposition temperature.

Secondly, weighing graphene oxide and inorganic compound by mass ratio of 1:1~1:100, mixing well and then placing into reactor, treating with heats at 200~1000° C. for 1~10 h, after the reaction, cooling and taking reactants out, washing successively with water and ethanol, vacuum drying at 80° C. for 24 h to obtain fluorographene.

In one preferred embodiment, the mass ratio of graphene oxide to inorganic compound containing fluorine is in the range of 1:1~1:50, graphene oxide reacts with inorganic compound containing fluorine at 500~800° C.

The specific temperature of treatment with heat is determined by actual inorganic compound containing fluorine.

Preparation of Fluorographene Using Organic Solid-Phase Method

Thermal decomposable polymers containing fluorine is used in this method to react with the graphene oxide obtained from step S20. The used polymers containing fluorine normally are polytetrafluoroethylene, polyhexafluoropropylene and polyvinylidene fluoride. In practice, any one of them or their combinations can be used.

Firstly, boiling polymers containing fluorine in boiling water for more than 3 h, then drying.

Secondly, mixing graphene oxide with polymers containing fluorine by mass ratio of 1:1~1:100 in organic solvent, then drying, after preforming, treating with heat at 200~800° C. in oxygen-free environment, reacting completely, then cooling to obtain fluorographene.

In one preferred embodiment, the mass ratio of graphene oxide to inorganic compound containing fluorine is in the range of 1:1~1:50, graphene oxide reacts with polymers containing fluorine at 500~800° C.

Normally, oxygen-free environment can be formed by inert gases or nitrogen.

The above-mentioned preparation method of fluorographene using graphite to prepare the graphene oxide, then making use of the reaction of graphene oxide with the compound containing fluorine under a certain temperature has simple process and can prepare fluorographene conveniently.

The obtained fluorographene can be used as electrode materials of super capacitor and lithium-ion secondary battery.

The present invention will be described below in detail referring to preferred embodiments.

EXAMPLE 1

In the present embodiment, the process of preparing fluorographene with graphene oxide was:

graphite→graphene oxide→fluorographene (1) Graphite: degree of purity was 99.5%

(2) Graphene oxide: graphene oxide was prepared using improved Hummers method, comprising: adding 20 g of 50-mesh sieved graphite powders, 10 g of potassium persulfate and 10 g of phosphorus pentoxide into concentrated sulfuric acid at 75° C., stirring well, cooling for more than 6 h, washing to neutrality, drying; adding the dried samples into 230 mL of concentrated sulfuric acid at 0° C., then adding 60 g of potassium permanganate, keeping the temperature of mixture below 20° C., then heating in an oil-bath at 40° C. and maintaining for 1.5 h, after that, adding slowly 920 mL of deionized water, after 15 minutes, adding 2.8 L of deionized water (containing 50 mL of hydrogen peroxide having concentration of 30%), subsequently, the color of mixture became bright yellow, filtrating by applying pressure while the mixture was hot, then washing with 5 L of hydrochloric acid having concentration of 10%, filtrating by applying pressure, vacuum drying at 60° C. for 48 h to obtain graphene oxide.

(3) fluorographene: fluorographene was prepared using solid-phase method, comprising: weighing inorganic compound containing fluorine, ammonium fluoride, and dry graphene oxide by mass ratio of ammonium fluoride: graphene oxide=100:1, mixing well and adding into reactor, reacting at 500° C. for 5 h, cooling slightly then taking out reactants, washing successively with water and ethanol, after that, vacuum drying at 80° C. for 24 h to obtain fluorographene.

The following test was performed on the obtained fluorographene:

Experimental conditions of XPS test: samples were analyzed with ESCALab220i-XL X-ray photoelectron spectroscopy from VG Scientific using roughly 300 W Al Kα X-ray radiation. The base pressure was at $3 \times 10^{-9}$ mbar when analyzing. The binding energies were referenced to the C1s line at 284.6 eV from adventitious carbon.

Relative quantity of element is given by $$\text{Relative atomic percent} = \frac{I_i/S_i}{\sum I_i/S_i} \times 100\%$$

where $I_i$—peak intensity (area) of element i
$S_i$—relative sensitivity factor of element i
Tab. 1 indicated that mass fraction of F was 53.5%.

Figure 2:
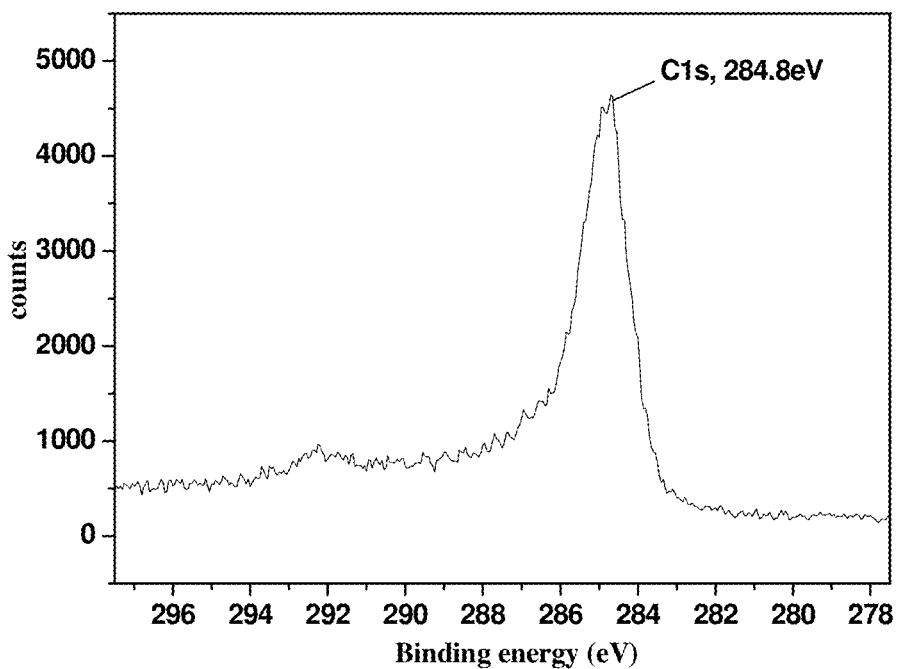
FIG. 2 is an XPS spectrum for C1s of fluorographene prepared in Example 1.

FIG. 2 is an XPS spectrum for C1s of fluorographene prepared in the present embodiment. It can be seen from the figure that a strong peak appears at 284.8 eV which represents C–C (284.8 eV), the hydrocarbon moieties of fluorographene.

Figure 3:
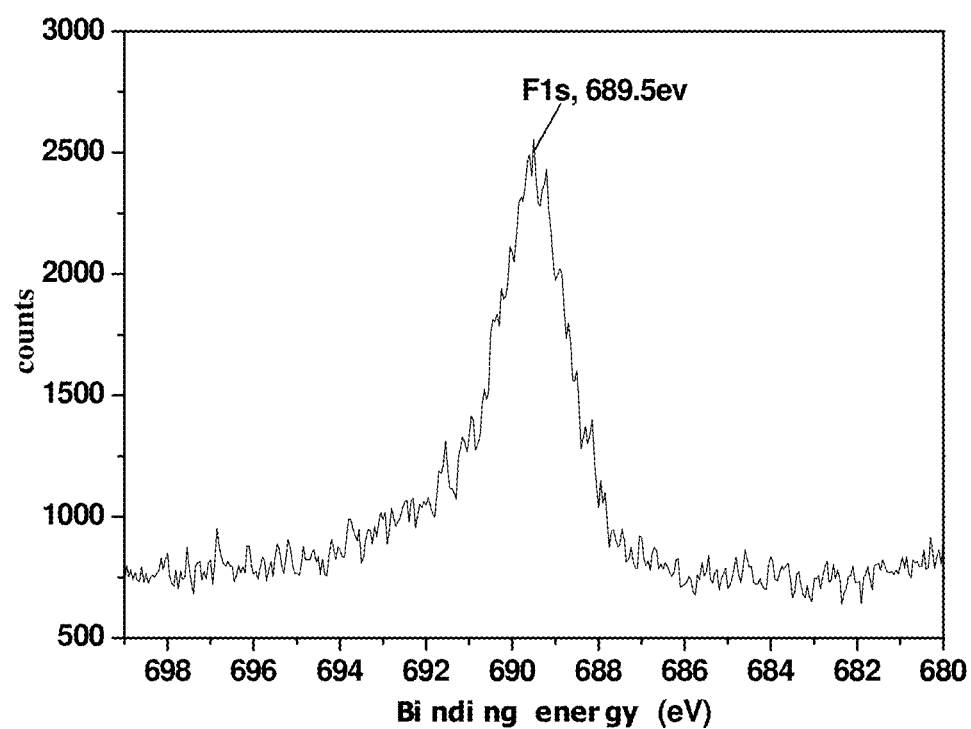
FIG. 3 is an XPS spectrum for F1s of fluorographene prepared in Example 1.

FIG. 3 is an XPS spectrum for F (1s) of fluorographene prepared in the present embodiment. It can be seen from the figure that a strong peak appears at 689.5 eV which represents C–F (689.5 eV), the hydrocarbon moieties of fluorographene as prepared.

Figure 4:
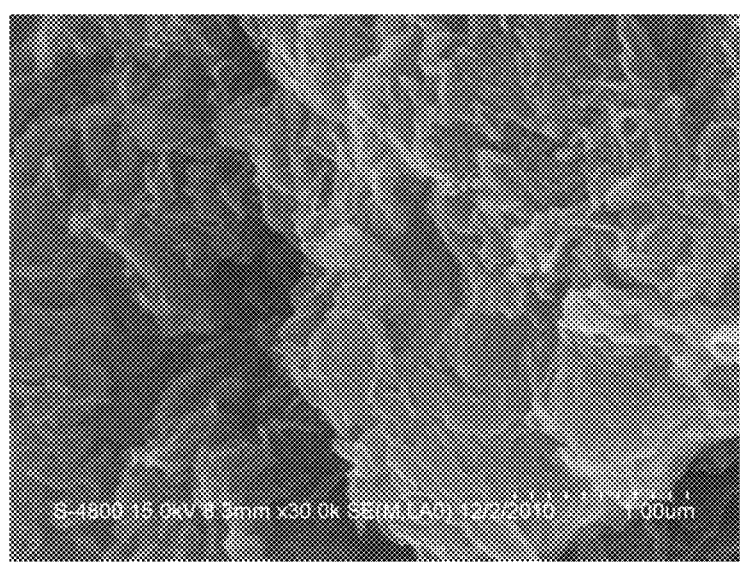
FIG. 4 is an SEM image of fluorographene prepared in Example 1.

FIG. 4 is an SEM image of fluorographene prepared in the present embodiment. It can be seen from the image that the obtained fluorographene have winkled structure which is favorable for improving specific surface area of materials.

EXAMPLE 2

In the present embodiment, the process of preparing fluorographene with graphene oxide was:
graphite→graphene oxide→fluorographene
(1) Graphite: degree of purity was 99.5%
(2) Graphene oxide: graphene oxide was prepared using improved Hummers method, comprising: adding 20 g of 50-mesh sieved graphite powders, 10 g of potassium persulfate and 10 g of phosphorus pentoxide into concentrated sulfuric acid at 95° C., stirring well, cooling for more than 6 h, washing to neutrality, drying; adding the dried samples into 230 mL of concentrated sulfuric acid at 0° C., then adding 60 g of potassium permanganate, keeping the temperature of mixture below 20° C., then heating in an oil-bath at 30° C. and maintaining for 2.5 h, after that, adding slowly 920 mL of deionized water, after 15 minutes, adding 2.8 L of deionized water (containing 50 mL of hydrogen peroxide having concentration of 30%), subsequently, the color of mixture became bright yellow, filtrating by applying pressure while the mixture was hot, then washing with 5 L of hydrochloric acid having concentration of 10%, filtrating by applying pressure, vacuum drying at 60° C. for 48 h to obtain graphene oxide.
(3) Fluorographene: fluorographene was prepared using solid-phase method, comprising: weighing inorganic compound containing fluorine, sodium fluoroborate, and dry graphene oxide by a certain mass ratio of sodium fluoroborate:graphene oxide=50:1, mixing well and adding into reactor, reacting at 800° C. for 4 h, cooling slightly then taking out reactants, washing successively with water and ethanol, after that, vacuum drying at 80° C. for 24 h to obtain fluorographene.
Tab. 1 indicated that mass fraction of F was 38.6%.

EXAMPLE 3

In the present embodiment, the process of preparing fluorographene with graphene oxide was:
graphite→graphene oxide→fluorographene
(1) Graphite: degree of purity was 99.5%
(2) Graphene oxide: graphene oxide was prepared using improved Hummers method, comprising: adding 20 g of 50-mesh sieved graphite powders, 10 g of potassium persulfate and 10 g of phosphorus pentoxide into concentrated sulfuric acid at 80° C., stirring well, cooling for more than 6 h, washing to neutrality, drying; adding the dried samples into 230 mL of concentrated sulfuric acid at 0° C., then adding 60 g of potassium permanganate, keeping the temperature of mixture below 20° C., then heating in an oil-bath at 35° C. and maintaining for 2 h, after that, adding slowly 920 mL of deionized water, after 15 minutes, adding 2.8 L of deionized water (containing 50 mL of hydrogen peroxide having concentration of 30%), subsequently, the color of mixture became bright yellow, filtrating by applying pressure while the mixture was hot, then washing with 5 L of hydrochloric acid having concentration of 10%, filtrating by applying pressure, vacuum drying at 60° C. for 48 h to obtain graphene oxide.
(3) Fluorographene: fluorographene was prepared using solid-phase method, comprising: weighing inorganic compound containing fluorine, sodium fluorosilicate, and dry graphene oxide by a certain mass ratio of sodium fluorosilicate:graphene oxide=80:1, mixing well and adding into reactor, reacting at 1000° C. for 1 h, cooling slightly then taking out reactants, washing successively with water and ethanol, after that, vacuum drying at 80° C. for 24 h to obtain fluorographene.
Tab. 1 indicated that mass fraction of F was 28.4%.

EXAMPLE 4

In the present embodiment, the process of preparing fluorographene with graphene oxide was:
graphite→graphene oxide→fluorographene
(1) Graphite: degree of purity was 99.5%
(2) Graphene oxide: graphene oxide was prepared using improved Hummers method, comprising: adding 20 g of 50-mesh sieved graphite powders, 10 g of potassium persulfate and 10 g of phosphorus pentoxide into concentrated sulfuric acid at 95° C., stirring well, cooling for more than 6 h, washing to neutrality, drying; adding the dried samples into 230 mL of concentrated sulfuric acid at 0° C., then adding 60 g of potassium permanganate, keeping the temperature of mixture below 20° C., then heating in an oil-bath at 35° C. and maintaining for 1.5 h, after that, adding slowly 920 mL of deionized water, after 15 minutes, adding 2.8 L of deionized water (containing 50 mL of hydrogen peroxide having concentration of 30%), subsequently, the color of mixture became bright yellow, filtrating by applying pressure while the mixture was hot, then washing with 5 L of hydrochloric acid having concentration of 10%, filtrating by applying pressure, vacuum drying at 60° C. for 48 h to obtain graphene oxide.
(3) Fluorographene: fluorographene was prepared using solid-phase method, comprising: weighing inorganic compound containing fluorine, potassium fluoroaluminate, and dry graphene oxide by a certain mass ratio of potassium fluoroaluminate:graphene oxide=45:1, mixing well and adding into reactor, reacting at 200° C. for 10 h, cooling slightly then taking out reactants, washing successively with water and ethanol, after that, vacuum drying at 80° C. for 24 h to obtain fluorographene.
Tab. 1 indicated that mass fraction of F was 35.2%.

EXAMPLE 5

In the present embodiment, the process of preparing fluorographene with graphene oxide was:
graphite→graphene oxide→fluorographene
(1) Graphite: degree of purity was 99.5%
(2) Graphene oxide: graphene oxide was prepared using improved Hummers method, comprising: adding 20 g of 50-mesh sieved graphite powders, 10 g of potassium persulfate and 10 g of phosphorus pentoxide into concentrated sulfuric acid at 75° C., stirring well, cooling for more than 6 h, washing to neutrality, drying; adding the dried samples into 230 mL of concentrated sulfuric acid at 0° C., then adding 60 g of potassium permanganate, keeping the temperature of mixture below 20° C., then heating in an oil-bath at 40° C. and maintaining for 2 h, after that, adding slowly 920 mL of deionized water, after 15 minutes, adding 2.8 L of deionized water (containing 50 mL of hydrogen peroxide having concentration of 30%), subsequently, the color of mixture became bright yellow, filtrating by applying pressure while the mixture was hot, then washing with 5 L of hydrochloric acid having concentration of 10%, filtrating by applying pressure, vacuum drying at 60° C. for 48 h to obtain graphene oxide.

(3) Fluorographene: fluorographene was prepared using solid-phase method, comprising: boiling polymers containing fluorine, polytetrafluoroethylene, in boiling water for 3 h, then drying, mixing the boiled and dried polytetrafluoroethylene with dry graphene oxide by a certain mass ratio of polytetrafluoroethylene:graphene oxide=30:1 in organic solvent, then placing into oven for drying at around 150° C., then preforming and placing into nickel boat, transferring the nickel boat to quartz tube of high temperature furnace and supplying appropriate nitrogen, after that, sealing and heating, the temperature of furnace was kept at 800° C., reacting for 5 h, taking out quartz tube for cooling, then obtaining fluorographene.

Tab. 1 indicated that mass fraction of F was 17%.

EXAMPLE 6

In the present embodiment, the process of preparing fluorographene with graphene oxide was:
graphite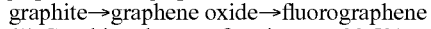graphene oxide→fluorographene
(1) Graphite: degree of purity was 99.5%
(2) Graphene oxide: graphene oxide was prepared using improved Hummers method, comprising: adding 20 g of 50-mesh sieved graphite powders, 10 g of potassium persulfate and 10 g of phosphorus pentoxide into concentrated sulfuric acid at 85° C., stirring well, cooling for more than 6 h, washing to neutrality, drying; adding the dried samples into 230 mL of concentrated sulfuric acid at 0° C., then adding 60 g of potassium permanganate, keeping the temperature of mixture below 20° C., then heating in an oil-bath at 35° C. and maintaining for 1.5 h, after that, adding slowly 920 mL of deionized water, after 15 minutes, adding 2.8 L of deionized water (containing 50 mL of hydrogen peroxide having concentration of 30%), subsequently, the color of mixture became bright yellow, filtrating by applying pressure while the mixture was hot, then washing with 5 L of hydrochloric acid having concentration of 10%, filtrating by applying pressure, vacuum drying at 60° C. for 48 h to obtain graphene oxide.

(3) Fluorographene: fluorographene was prepared using solid-phase method, comprising: boiling polymers containing fluorine, polyhexafluoropropylene, in boiling water for 3 h, then drying, mixing the boiled and dried polyhexafluoropropylene with dry graphene oxide by a certain mass ratio of polyhexafluoropropylene:graphene oxide=15:1 in organic solvent, then placing into oven for drying at around 150° C., then preforming and placing into nickel boat, transferring the nickel boat to quartz tube of high temperature furnace and supplying appropriate nitrogen, after that, sealing and heating, the temperature of furnace was kept at 200° C., reacting for 4 h, taking out quartz tube for cooling, then obtaining fluorographene.

Tab. 1 indicated that mass fraction of F was 0.5%.

EXAMPLE 7

In the present embodiment, the process of preparing fluorographene with graphene oxide was:
graphite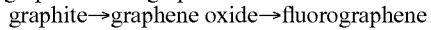graphene oxide→fluorographene
(1) Graphite: degree of purity was 99.5%
(2) Graphene oxide: graphene oxide was prepared using improved Hummers method, comprising: adding 20 g of 50-mesh sieved graphite powders, 10 g of potassium persulfate and 10 g of phosphorus pentoxide into concentrated sulfuric acid at 85° C., stirring well, cooling for more than 6 h, washing to neutrality, drying; adding the dried samples into 230 mL of concentrated sulfuric acid at 0° C., then adding 60 g of potassium permanganate, keeping the temperature of mixture below 20° C., then heating in an oil-bath at 35° C. and maintaining for 2.5 h, after that, adding slowly 920 mL of deionized water, after 15 minutes, adding 2.8 L of deionized water (containing 50 mL of hydrogen peroxide having concentration of 30%), subsequently, the color of mixture became bright yellow, filtrating by applying pressure while the mixture was hot, then washing with 5 L of hydrochloric acid having concentration of 10%, filtrating by applying pressure, vacuum drying at 60° C. for 48 h to obtain graphene oxide.

(3) Fluorographene: fluorographene was prepared using solid-phase method, comprising: boiling polymers containing fluorine, polyvinylidene fluoride, in boiling water for 3 h, then drying, mixing the boiled and dried polyvinylidene fluoride with dry graphene oxide by a certain mass ratio of polyvinylidene fluoride:graphene oxide=5:1 in organic solvent, then placing into oven for drying at around 150° C., then preforming and placing into nickel boat, transferring the nickel boat to quartz tube of high temperature furnace and supplying appropriate nitrogen, after that, sealing and heating, the temperature of furnace was kept at 1000° C., reacting for 1h, taking out quartz tube for cooling, then obtaining fluorographene.

Tab. 1 indicated that mass fraction of F was 18.5%.

EXAMPLE 8

In the present embodiment, the process of preparing fluorographene with graphene oxide was:
graphite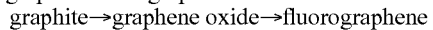graphene oxide→fluorographene
(1) Graphite: degree of purity was 99.5%
(2) Graphene oxide: graphene oxide was prepared using improved Hummers method, comprising: adding 20 g of 50-mesh sieved graphite powders, 10 g of potassium persulfate and 10 g of phosphorus pentoxide into concentrated sulfuric acid at 80° C., stirring well, cooling for more than 6 h, washing to neutrality, drying; adding the dried samples into 230 mL of concentrated sulfuric acid at 0° C., then adding 60 g of potassium permanganate, keeping the temperature of mixture below 20° C., then heating in an oil-bath at 35° C. and maintaining for 1.5 h, after that, adding slowly 920 mL of deionized water, after 15 minutes, adding 2.8 L of deionized water (containing 50 mL of hydrogen peroxide having concentration of 30%), subsequently, the color of mixture became bright yellow, filtrating by applying pressure while the mixture was hot, then washing with 5 L of hydrochloric acid having concentration of 10%, filtrating by applying pressure, vacuum drying at 60° C. for 48 h to obtain graphene oxide.

(3) Fluorographene: fluorographene was prepared using solid-phase method, comprising: boiling polymers containing fluorine, polyvinylidene fluoride, in boiling water for 3 h, then drying, mixing the boiled and dried polyvinylidene fluoride with dry graphene oxide by a certain mass ratio of polyvinylidene fluoride:graphene oxide=1:1 in organic solvent, then placing into oven for drying at around 150° C., then preforming and placing into nickel boat, transferring the nickel boat to quartz tube of high temperature furnace and supplying appropriate nitrogen, after that, sealing and heating, the temperature of furnace was kept at 500° C., reacting for 3 h, taking out quartz tube for cooling, then obtaining fluorographene.

Tab. 1 indicated that mass fraction of F was 4.7%.

Tbl. 1 contents of F of fluorographene

| No. | Example 1 | Example 2 | Example 3 | Example 4 | Example 5 | Example 6 | Example 7 | Example 8 |
|---|---|---|---|---|---|---|---|---|
| F content | 53.5% | 38.6% | 28.4% | 35.2% | 17% | 0.5% | 18.5% | 4.7% |

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A preparation method of fluorographene, wherein the mass fraction of F is in the range of 0.5%<F%<53.5% and the mass fraction of C is in the range of 46.5%<C% <99.5%, comprising: providing graphite; preparing graphene oxide with said graphite; mixing said graphene oxide with a compound containing a fluorine by mass ratio of 1:1~100:1 in an oxygen-free environment, then reacting at 200~1000° C. for 1~10 hours, then cooling down to obtain said fluorographene.

2. The preparation method of fluorographene as claimed in claim 1, wherein, said compound containing fluorine is at least one of ammonium fluoride, sodium fluoroborate, potassium fluoroborate, potassium fluoroaluminate and sodium fluorosilicate.

3. The preparation method of fluorographene as claimed in claim 1, wherein, said compound containing fluorine at least one of polytetrafluoroethylene, polyhexafluoropropylene and polyvinylidene fluoride.

4. The preparation method of fluorographene as claimed in claim 1, wherein the mass ratio of said graphene oxide to said compound containing fluorine is in the range of 1:1~1:50.

5. The preparation method of fluorographene as claimed in claim 1, wherein said graphene oxide reacts with said compound containing fluorine at 500~800° C. to obtain said fluorographene.

6. The preparation method of fluorographene as claimed in claim 1, wherein, further comprising purification process that: after obtaining said fluorographene, washing said fluorographene successively with water and ethanol, then drying.

7. The preparation method of fluorographene as claimed in claim 1, wherein, degree of purity of said graphite is higher than 99.5%.

8. The preparation method of fluorographene as claimed in claim 2, wherein the mass ratio of said graphene oxide to said compound containing fluorine is in the range of 1:1~1:50.

9. The preparation method of fluorographene as claimed in claim 3, wherein the mass ratio of said graphene oxide to said compound containing fluorine is in the range of 1:1~1:50.

10. The preparation method of fluorographene as claimed in claim 2, wherein said graphene oxide reacts with said compound containing fluorine at 500~800° C. to obtain said fluorographene.

11. The preparation method of fluorographene as claimed in claim 3, wherein said graphene oxide reacts with said compound containing fluorine at 500~800° C. to obtain said fluorographene.

* * * * *